Nov. 7, 1933.                B. BRONSON                1,934,256
METHOD OF MAKING RUNNING BOARDS
Original Filed June 9, 1930
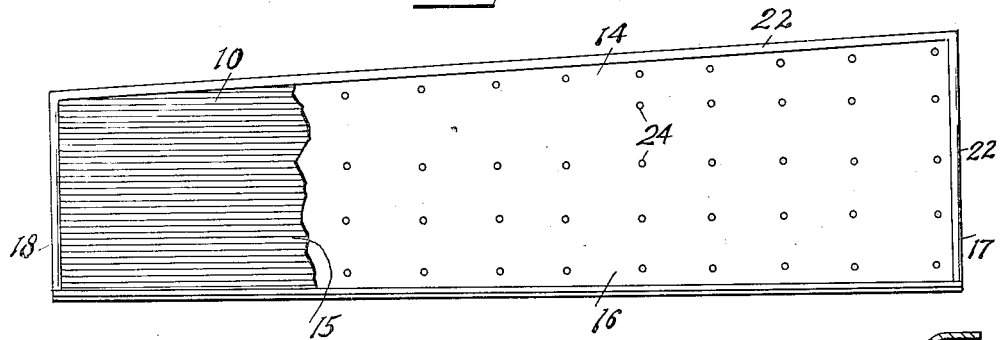
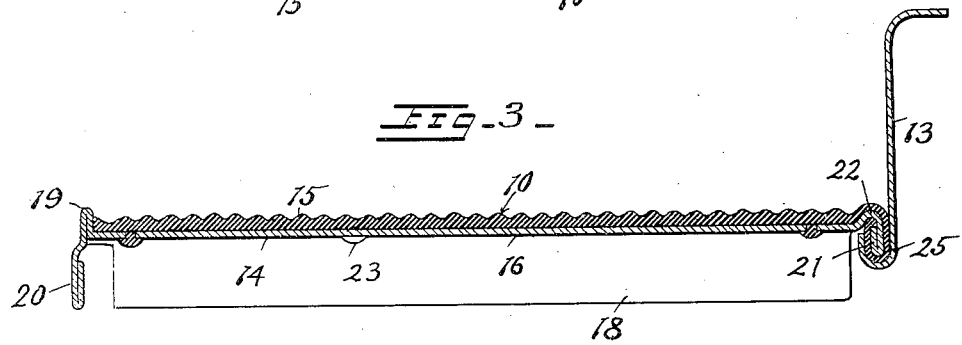
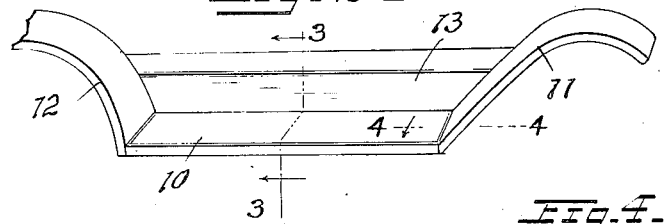
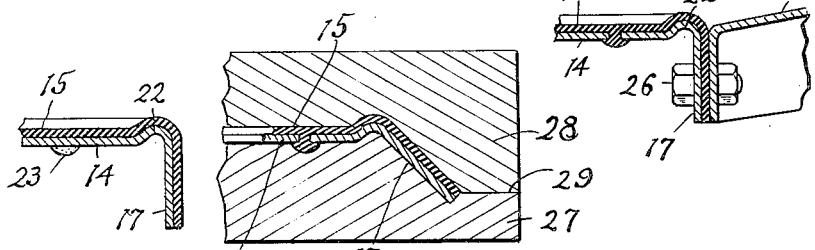
Inventor.
BUDD BRONSON
Kwis Hudson & Kent
attys.

Patented Nov. 7, 1933

1,934,256

UNITED STATES PATENT OFFICE 1,934,256

METHOD OF MAKING RUNNING BOARDS

Budd Bronson, Cleveland, Ohio, assignor to The Ohio Rubber Company, Cleveland, Ohio, a corporation of Ohio Original applicaton June 9, 1930, Serial No. 460,007. Divided and this application February 23, 1932. Serial No. 594,590

3 Claims. (Cl. 29—152)

This invention relates to composite articles such as rubber covered vehicle running boards, and as its principal object aims to provide a novel method of making these articles.

Another object of my invention is to provide a novel method of making composite articles of the type having covering material molded and secured to a metal body and an angularly disposed portion thereof, wherein the covering material is first applied to the body so as to extend integrally over the angularly disposed portion, which portion is subsequently bent to the desired position.

This application is filed as a division of my original application, Serial No. 460,007, filed June 9, 1930.

The invention may be further briefly summarized as consisting in certain novel steps of procedure hereinafter described and particularly set out in the appended claims.

In the accompanying sheet of drawings,

Fig. 1 is a top plan view showing a composite running board which has been constructed according to my method.

Fig. 2 is a perspective view showing the composite running board in assembled position.

Fig. 3 is a transverse sectional elevation taken on line 3—3 of Fig. 2.

Fig. 4 is a sectional elevation taken on line 4—4 of Fig. 2.

Fig. 5 is a partial sectional view illustrating the vulcanizing step and showing the relative arrangement of the parts of the running board structure after the rubber covering has been vulcanized thereto, and Fig. 6 is a partial sectional view showing the position of one of the rubber covered flanges of the running board after the bending operation has been performed thereon.

In the accompanying drawing, wherein I have illustrated my novel method of making composite articles, I have also disclosed a form of rubber covered vehicle running board 10, as representing one of the articles which may be produced by my method. This running board, as herein illustrated, may be supported upon the usual brackets provided on the frame of a motor vehicle, and may be attached at its ends to the front and rear fenders 11 and 12, and along its inner side edge to the part 13 of the vehicle structure which is commonly known as the kick plate or splash pan. My novel method, as will be more fully disclosed hereinafter, makes possible the application of the rubber covering of the running board to the body and flange portions thereof by simplified means and without damaging the rubber covering.

Before proceeding with a detailed disclosure of my method, it is deemed advisable to describe the running board structure shown in the drawing. This running board comprises a metallic body 14, having a non-metallic tread 15, preferably in the form of sheet rubber covering, secured thereto. The metallic body is preferably constructed from hot-passed steel, as by suitable stamping or drawing operations and is shown, in this instance, as having an elongated, substantially flat body portion 16. At the forward and rear ends of the running board body some of the metal thereof is bent downwardly to form the depending flanges 17 and 18 for connection, respectively, with the front and rear fenders. Along its outer edge the metal of the body may be flanged or folded to form the longitudinally extending upstanding flange 19 and the longitudinally extending depending flange 20. Along the inner edge of the running board body, or, in other words, along the edge thereof which is nearest the center line of the vehicle, the metal of the body portion 16 is bent downwardly, to provide the longitudinally extending flange 21.

In constructing the metal running board body, I preferably provide the same with a rounded marginal bead 22, which projects somewhat above the surface of the body portion 16. This rounded bead extends across the ends of the metal body adjacent the flanges 17 and 18, and also extends along the side of the body adjacent the flange 21. In this location the bead, reenforces and strengthens the metal body and also assists in distributing the rubber during the vulcanizing operation, as will be more fully explained hereinafter.

By the application of heat and pressure to the rubber covering, which is applied to the metal body this covering is vulcanized in contact with the metal and is firmly united thereto by some of the rubber being squeezed into the pores and interstices of the hot-passed metal. If desired, additional securing means may be provided in the form of rubber rivets 23, which are formed integral with the covering during the vulcanizing operation by squeezing some of the rubber through the spaced perforations 24 of the metal body. During the vulcanizing operation the exposed upper surface of the rubber covering may, if desired, be provided with a suitable design or configuration, such as the ribbed pattern illustrated in the drawing.

At the ends of the metal body and along the inner edge thereof, the rubber covering is carried over the rounded bead 22 and is vulcanized to the depending flanges extending along these edges. The covering which extends down upon the end flanges 17 and 18 terminates substantially flush with the lower edges of these flanges, while the covering which is carried down upon the side flange 21 extends around the lower edge of this flange and extends upwardly upon its opposite surface and fills the longitudinally extending depression formed in the underside of the bead 22. When the running board is assembled in place, the rubber covered flange 21 engages in a hook-like flange 25 extending along the lower edge of the splash pan 13. At the ends of the running board, the rubber covered flanges 17 and 18 are secured to the fenders 11 and 12, respectively, by suitable bolts 26, which extend through the flanges of the running board and through the flanges of the fenders and clamp the rubber covering therebetween. By extending the rubber covering down over these flange portions of the metal body which cooperate with flange portions of the vehicle structure, the rubber forms a durable packing between these flange portions and eliminates squeaks and rattles. The packing thus formed is also impervious to moisture, and by preventing an accumulation of moisture at these points, corrosion is greatly retarded.

Heretofore, in constructing composite vehicle running boards of this type, and in the construction of other articles in which rubber covering is vulcanized to a body portion of a metallic structure and to a flange portion disposed substantially at right angles to the plane of such body portion, it has been necessary to employ vulcanizing presses having cooperating mold members which are relatively movable in at least two directions during the opening of the mold. Vulcanizing presses of this type have been necessary to prevent the rubber covering from being torn loose from the flange portion during the opening of the mold. In other words, if a pair of mold members of the usual type having separating movement in one direction only were used to apply the rubber covering to the running board body and flange portion, illustrated in Fig. 4, the separating movement of the mold members would cause the rubber covering to be stripped or torn loose from the flange 17.

Vulcanizing presses, having mold members which are relatively movable in at least two directions during the opening of the mold, represent more complicated and thus more costly vulcanizing apparatus than would be required if the rubber covering could be vulcanized in a mold which can be opened by separating movement of the mold members in one direction only. To simplify the production of such composite articles I have devised a method whereby the covering may be vulcanized and secured to the angularly disposed portions of a body in a mold composed of members which have relative separating movement in one direction only. In carrying out my method, the metallic body is constructed with the desired flange portions thereon, but these flange portions are not bent to their ultimate position until after the rubber covering has been secured in place. When my method is used for constructing running boards of the type illustrated in the drawing and already described in detail, the depending flanges which are to be covered with rubber, such as the end flanges 17 and 18, are bent downwardly from the body portion and are left at an inclination of approximately 120° from the plane of the body portion, or, in other words, are left extending outwardly in obtuse relation to the plane of the body portion, substantially as represented in Fig. 5. After the rubber has been molded and vulcanized to the metal body so as to extend over the flat body portion thereof and over these inclined flanges as an integrally formed covering, the flanges are subjected to further bending, whereby they are deflected to their desired ultimate position of approximately 90° from the plane of the body portion of the running board as represented in Fig. 6. During the bending of the flange portions to their ultimate positions the soft rubber covering yields readily and is not damaged or torn loose. This bending operation may be performed by any suitable apparatus, such as that disclosed in the Fleming and Winegar application, Serial No. 545,456, filed June 19, 1931, wherein a press is provided with a reciprocable slide having a set of rollers for bending the rubber covered flanges to the desired position.

In carrying out the vulcanizing step of my method, cooperating mold members 27 and 28 may be employed of substantially the form and arrangement illustrated in Fig. 5. As shown in this figure of the drawing, the lower mold member 27, which is usually the stationary member, is provided with angularly disposed portions or faces for supporting the angularly disposed body and flange portions of the running board. The top mold member 28 is reciprocably movable relative to the member 27, usually by being attached to the reciprocable slide of a vulcanizing press, and is provided with angularly disposed molding faces for cooperation with the angularly disposed portions of the metal body. As shown in the drawing, these mold members are arranged to separate on a plane, represented by the line 29, so that during the opening of the mold, after the vulcanizing operation, the movement of the mold member 28 away from the mold member 27 will take place along a directional line which is substantially perpendicular to the plane of the metal body and will not result in the rubber covering being torn loose from the flange 17.

When the metal running board body is placed on the lower mold member 27, the flange 21 extends into a depression provided in this mold member and during the vulcanizing operation some of the rubber flows around the edge of this flange so as to fill the depression of the mold member. The rubber which flows around the edge of this flange thus forms that portion of the covering which is vulcanized to the under or reverse side of this flange and which extends upwardly into the depression of the bead 22. This bead, as already stated, assists in the distribution of the rubber by forming an elevated barrier, which, to some extent, retards the flow of rubber during the vulcanizing operation, so that an excessive amount of rubber will not be squeezed out in forming the coverings for the flanges.

It will now be readily seen that I have provided a novel method for the production of rubber covered running boards and other composite articles, which permits the use of a more simplified form of vulcanizing apparatus and wherein a non-metallic covering is molded and attached to a body and to flange portions thereof which are subsequently bent to the desired position.

In the specification and claims of this application I have mentioned rubber as the non-metallic covering material which is applied to the body of the article being formed, but it should be understood that any other suitable non-metallic covering material having substantially the characteristics of rubber may be used for this purpose.

While I have disclosed the method of my invention in a detailed manner, it should be understood, however, that I do not intend to limit myself to the performance of the steps of my method in the exact manner herein disclosed, but regard my invention as including such changes and modifications as do not involve a departure from the spirit of the invention and the scope of the appended claims.

Having thus described my invention what I claim is:

1. The method of making running boards which comprises forming a metal body with a flange portion extending obtusely therefrom, attaching a non-metallic tread to said body and flange portion by the application of heat and pressure between separable mold members, and thereafter bending said flange portion to change its angular relation to said body.

2. The method of making running boards which comprises forming a metal body with a flange portion extending obtusely therefrom, vulcanizing a rubber covering to said body and to said flange portion by applying heat and pressure to the rubber in a vulcanizing press having separable mold members, and thereafter bending the rubber covered flange portion to change its angular relation to said body.

3. The method of making rubber covered flanged running boards which comprises forming a sheet metal running board body with a flange portion extending obtusely to the plane of the body, attaching rubber covering to said body so as to extend integrally over said flange portion by applying heat and pressure to the rubber between cooperating mold members which have rectilineal relative separating movement along a directional line substantially perpendicular to the plane of the body, removing the rubber covered body from between the mold members, and thereafter bending the rubber covered flange to change its angular relation to the plane of the body.

BUDD BRONSON.